United States Patent
Venugopal et al.

(10) Patent No.: US 11,943,777 B2
(45) Date of Patent: *Mar. 26, 2024

(54) DETERMINING A DEFAULT UPLINK (UL) TRANSMISSION CONFIGURATION INDICATOR (TCI) STATE

(71) Applicant: QUALCOMM Incorporated, San Diego, CA (US)

(72) Inventors: Kiran Venugopal, Raritan, NJ (US); Yan Zhou, San Diego, CA (US); Tianyang Bai, Somerville, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 17/126,820

(22) Filed: Dec. 18, 2020

(65) Prior Publication Data

US 2021/0195626 A1 Jun. 24, 2021

Related U.S. Application Data

(60) Provisional application No. 62/951,721, filed on Dec. 20, 2019.

(51) Int. Cl.
*H04W 72/23* (2023.01)
*H04L 5/00* (2006.01)
*H04W 72/51* (2023.01)

(52) U.S. Cl.
CPC ........... *H04W 72/23* (2023.01); *H04L 5/0048* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 10,897,752 B2 * | 1/2021 | Venugopal | H04B 7/0695 |
| 2019/0182682 A1 * | 6/2019 | Kim | H04B 7/0695 |
| 2019/0261338 A1 | 8/2019 | Akkarakaran et al. | |
| 2019/0268961 A1 * | 8/2019 | Tsai | H04W 16/28 |
| 2020/0059398 A1 * | 2/2020 | Pan | H04W 72/0413 |
| 2020/0145079 A1 * | 5/2020 | Marinier | H04B 7/0617 |
| 2020/0229098 A1 * | 7/2020 | Cheng | H04W 52/0235 |

(Continued)

OTHER PUBLICATIONS

International Search Report and Written Opinion—PCT/US2020/066274—ISA/EPO—dated Mar. 26, 2021.

(Continued)

*Primary Examiner* — Phirin Sam
(74) *Attorney, Agent, or Firm* — Patterson + Sheridan, L.L.P.

(57) ABSTRACT

Certain aspects of the present disclosure provide techniques for determining default parameters to use in the absence of a signaled uplink transmission configuration indicator (TCI) state for uplink transmissions. In some cases, a UE may determine, based on one or more rules, at least one of a default uplink beam or default path loss reference signal (PL RS) to use an uplink transmission in the absence of a signaled uplink transmission configuration indicator (TCI) state for the uplink transmission; and send the uplink transmission in accordance with the determination.

30 Claims, 8 Drawing Sheets

(56) References Cited

U.S. PATENT DOCUMENTS

| | | | | |
|---|---|---|---|---|
| 2020/0314860 A1* | 10/2020 | Zhou | ............... | H04W 72/1289 |
| 2020/0396760 A1* | 12/2020 | Yi | ............... | H04L 1/1864 |
| 2021/0135821 A1* | 5/2021 | Guan | ............... | H04L 5/0048 |
| 2021/0135830 A1* | 5/2021 | Yu | ............... | H04L 5/0053 |
| 2021/0282167 A1* | 9/2021 | Wang | ............... | H04W 72/046 |
| 2021/0345299 A1* | 11/2021 | Gao | ............... | H04B 7/0695 |
| 2022/0070853 A1* | 3/2022 | Guo | ............... | H04W 72/046 |
| 2022/0159579 A1* | 5/2022 | Cirik | ............... | H04W 52/242 |
| 2022/0167278 A1* | 5/2022 | Cirik | ............... | H04W 52/146 |
| 2022/0200687 A1* | 6/2022 | Guo | ............... | H04L 5/0053 |
| 2022/0295413 A1* | 9/2022 | Park | ............... | H04W 52/42 |

OTHER PUBLICATIONS

LG Electronics: "Feature Lead Summary of Enhancements on Multi-Beam Operations", 3GPP TSG RAN WG1 Meeting #99, 3GPP Draft; R1-1912277, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, pp. 1-34, Nov. 19, 2019 (Nov. 19, 2019), XP051826596, Retrieved from the Internet: URL: https://ftp.3gpp.org/tsg_ran/WG1_RL1/TSGR1_99/Docs/R1-1912277.zip R1-1912277 R1#99 FL_summary_MultiBeam(MB1) v7.docx [retrieved on Nov. 19, 2019] p. 22, bottom table, ZTE contribution, Section 2.3; p. 11-p. 16.

Qualcomm Incorporated: "Enhancements on Multi-Beam Operation", 3GPP Draft, R1-1912968, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 19, 2019-Nov. 22, 2019, Nov. 8, 2019 (Nov. 8, 2019), XP051823730, pp. 1-20, Retrieved from the Internet: URL:https://ftp.3gpp.org/tsg_ran/WG1_RL1/TSGR1_99/Docs/R1-1912968.zip [retrieved on Nov. 8, 2019] Section 7.2 and 7.3, Proposal 20, p. 14-p. 15.

* cited by examiner

DETERMINING A DEFAULT UPLINK (UL) TRANSMISSION CONFIGURATION INDICATOR (TCI) STATE

CROSS-REFERENCE TO RELATED APPLICATIONS

This application claims benefit to U.S. Provisional Patent Application Ser. No. 62/951,721, entitled "Determining a Default Uplink (UL) Transmission Configuration Indicator (TCI) State," filed Dec. 20, 2019, and assigned to the assignee hereof, the contents of which are hereby incorporated by reference in its entirety.

BACKGROUND

Field of the Disclosure

Aspects of the present disclosure relate to wireless communications, and more particularly, to techniques for determining a transmission configuration indicator (TCI) state for use in uplink transmissions performed by a user equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes determining, based on one or more rules, at least one of a default uplink beam or default path loss reference signal (PL RS) to use an uplink transmission in the absence of a signaled uplink transmission configuration indicator (TCI) state for the uplink transmission, and sending the uplink transmission in accordance with the determination.

Certain aspects of the disclosure relate to a method for wireless communication by a network entity. The method generally includes determining, based on one or more rules, at least one of a default uplink beam or default path loss reference signal (PL RS) for a user equipment (UE) to use for receiving an uplink transmission in the absence of a signaled uplink transmission configuration indicator (TCI) state for the uplink transmission, and processing the uplink transmission in accordance with the determination.

Aspects of the present disclosure also provide various apparatuses, means, and computer readable including instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
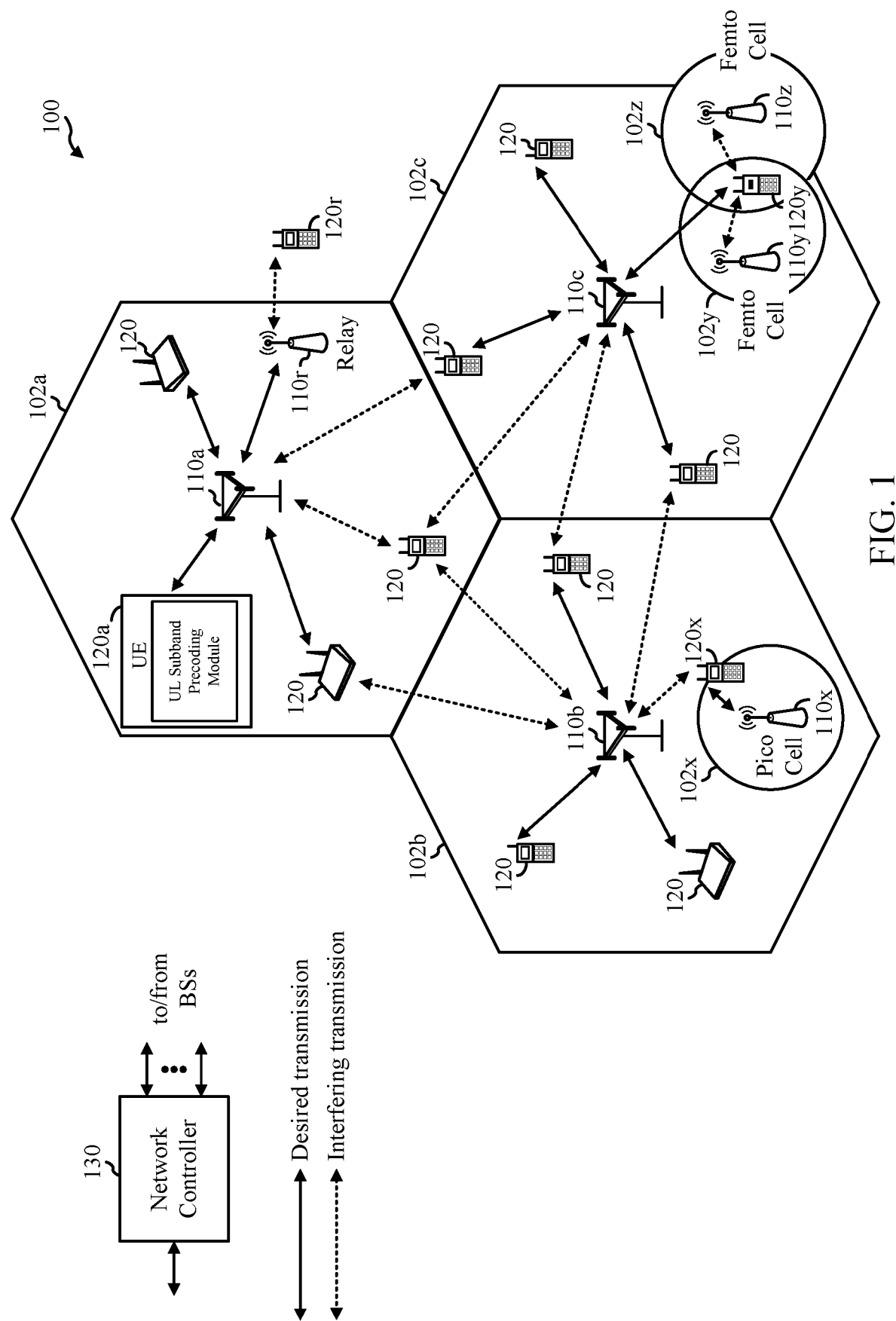
FIG. 1 is a block diagram conceptually illustrating an example telecommunications system, in accordance with certain aspects of the present disclosure.

Aspects of the present disclosure relate to wireless communications, and more particularly, to techniques for configuring default beams when an uplink TCI state is not indicated to a user equipment.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 in the wireless communication network 100 may include an UL subband precoding module configured to perform (or assist the UE 120 in performing) operations 1600 described below with reference to FIG. 16. Similarly, a base station 120 (e.g., a gNB) may include an UL subband precoding module configured to perform (or assist the base station 120 in performing) operations 1700 described below with reference to FIG. 17.

As illustrated in FIG. 1, the wireless communication network 100 may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08

MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
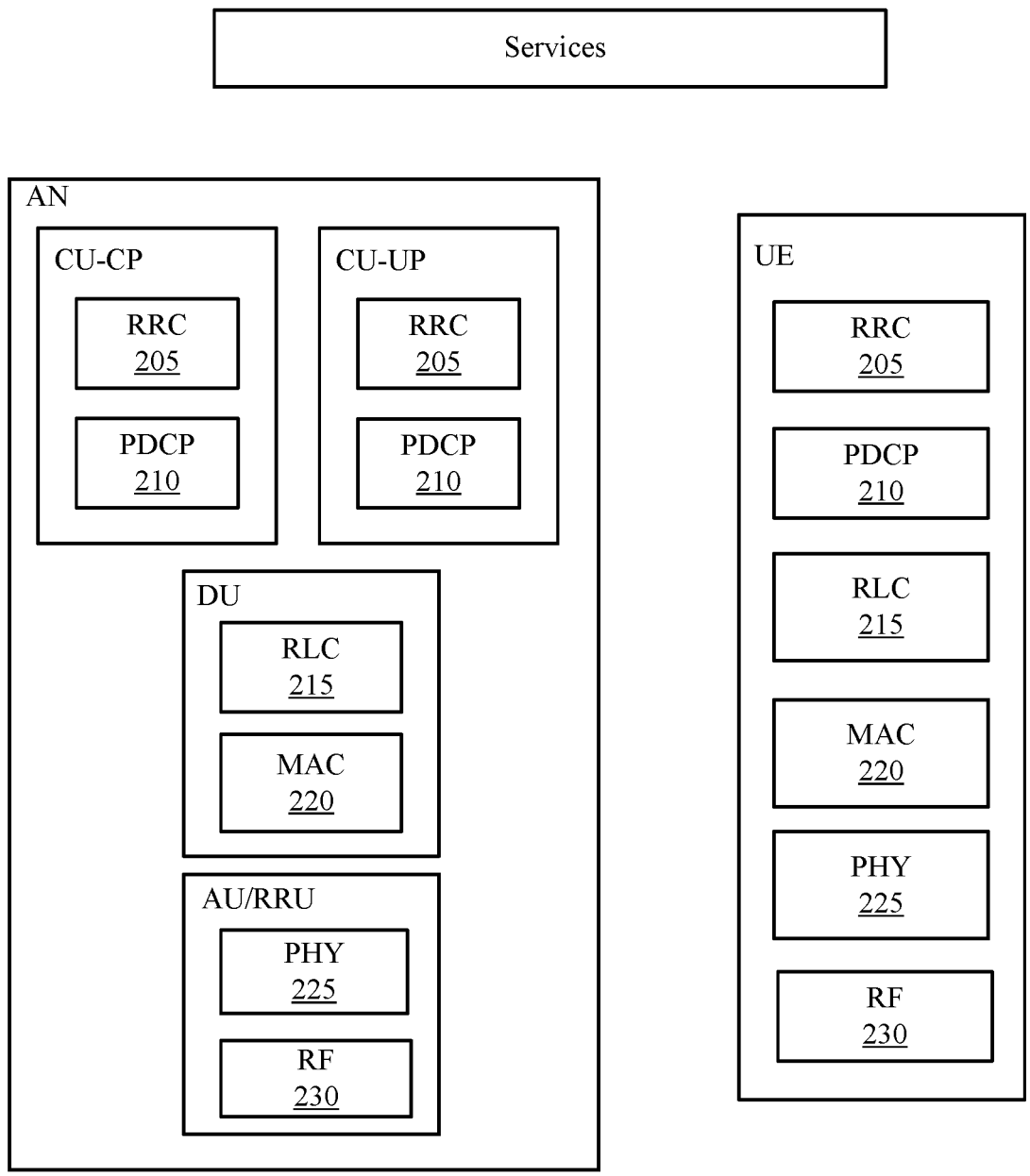
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the AN (e.g., BS 110 in FIG. 1). The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
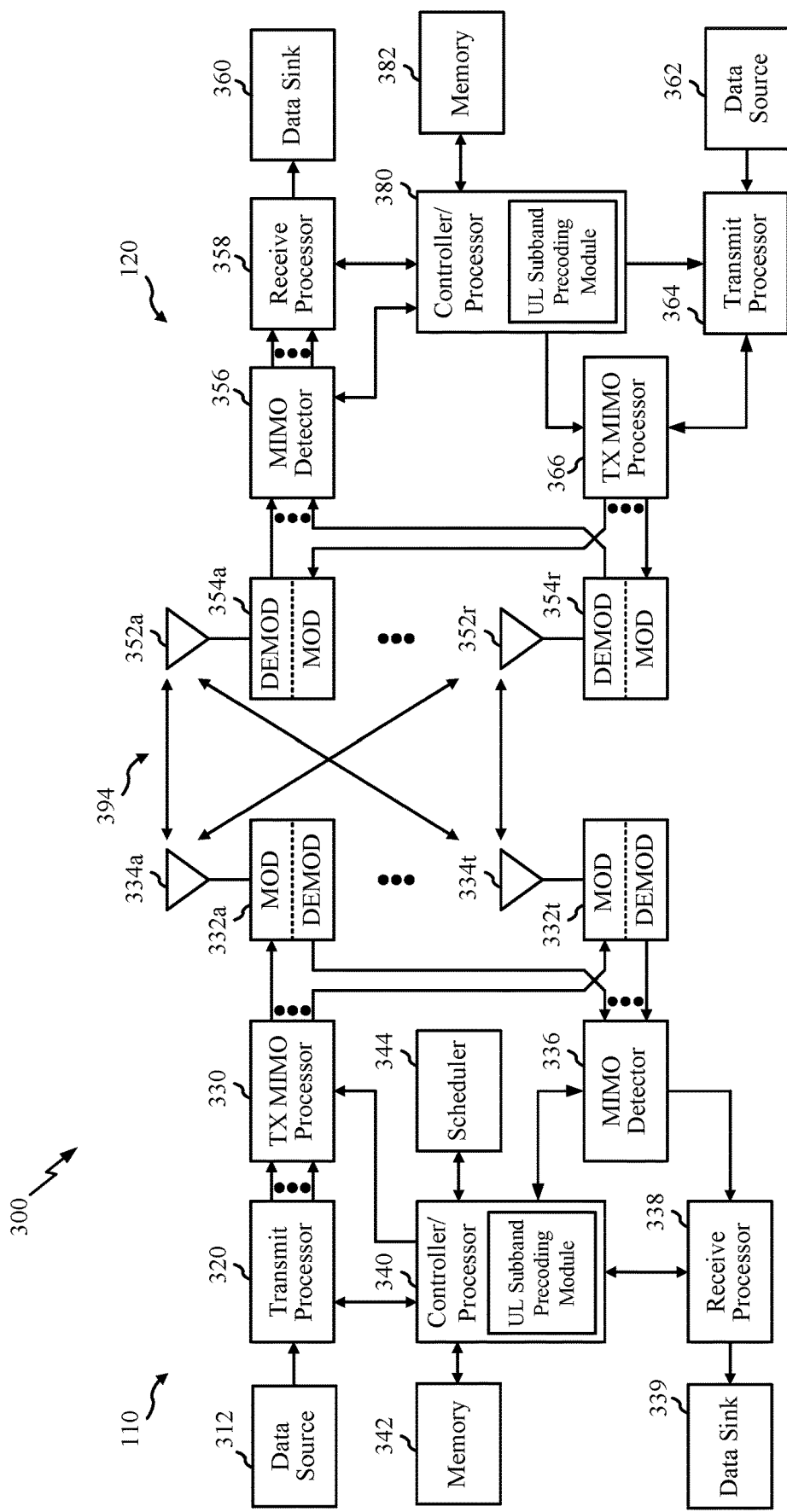
FIG. 3 is a block diagram conceptually illustrating a design of an example base station (BS) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 may be configured (or used) to perform operations 1600 of FIG. 16 and/or antennas 334, processors 320, 330, 338, and/or controller/processor 340 of the BS 110 may be configured (or used) to perform operations 1700 described below with reference to FIG. 17.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 120) includes multiple transmit antennas 354a through 354r, and a receiver (e.g., UE 110) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 110, a BS 120, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Figure 4:
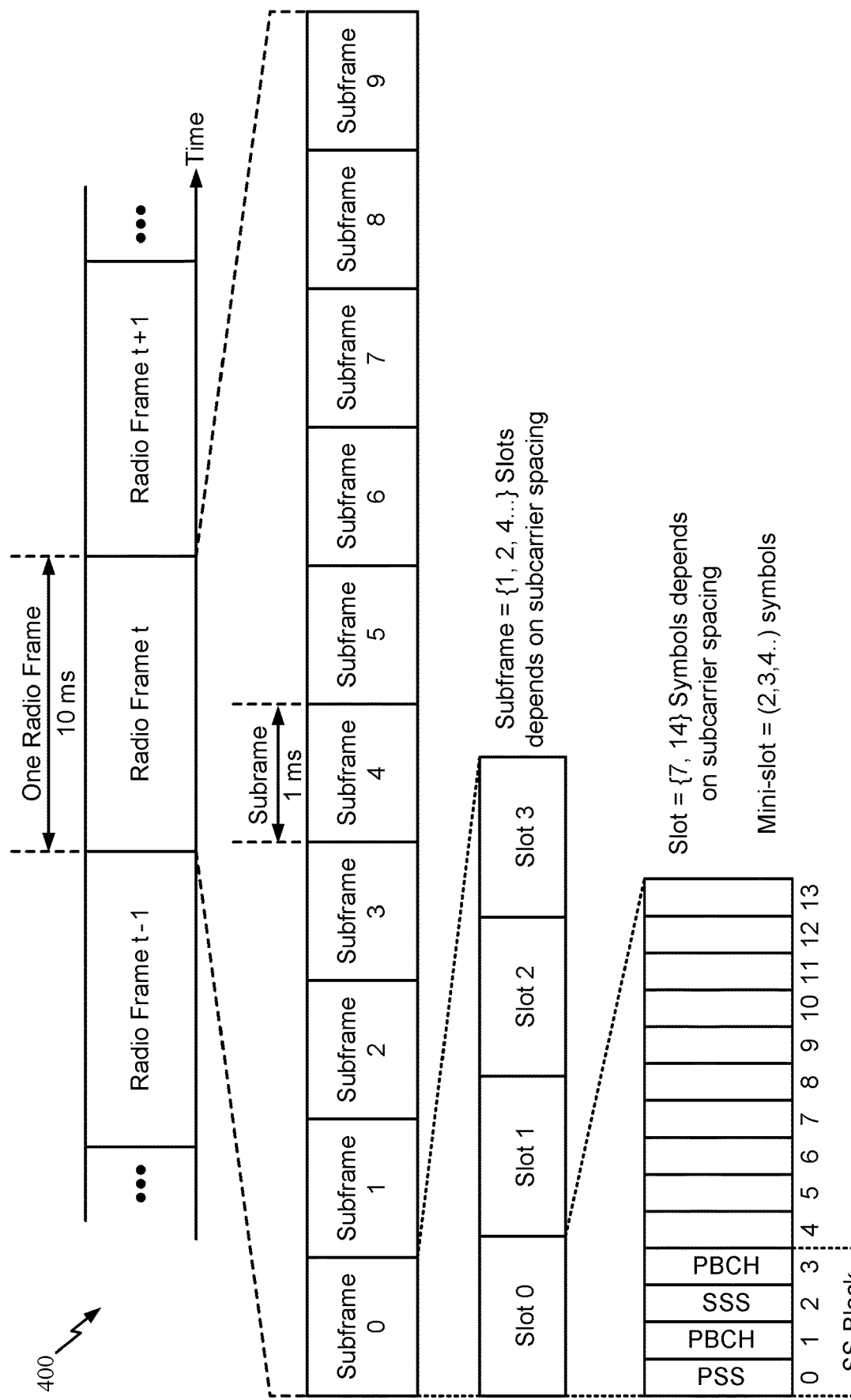
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Default Configuration of Uplink (UL) Transmission Configuration Indicator (TCI) State Aspects of the present disclosure provide mechanisms that may provide for default configuration of uplink transmission configuration states (e.g., when no TCI state is configured when uplink transmissions are to be performed). By providing techniques for identifying a default configuration for uplink transmissions when no TCI state is configured, aspects of the present disclosure may allow for assumptions to be made to facilitate uplink beam selection. A UE need not wait for a gNodeB to indicate a configuration of an UL TCI state before performing uplink transmissions in a multi-beam environment. Because a UE may not need to wait for the gNodeB to indicate a configuration of an UL TCI state before performing uplink transmissions, latencies may be reduced from signaling reductions in communications between the UE and the gNodeB, and a UE may be able to more quickly commence uplink transmissions to the gNodeB.

In Rel-16, signaling overhead reductions may allow a gNB to not configure spatial relations for the physical uplink control channel (PUCCH) or SRS. Rule based determinations may be used to identify a default spatial relation that is to be used if a spatial relation has not been configured. The use of rule-based determinations to identify default spatial relations may allow for lower latency in communications between a UE and a gNB, which may improve overall throughput.

Enhancements for multi-beam operation may target different operating frequencies, such as the FR1 and FR2 bands. Some of these enhancements may facilitate more efficient beam management to support intra-cell and inter-cell mobility and/or a larger number of configured TCI states. For example, a common beam may be used for data and control transmission and/or reception for both downlink and uplink (e.g., for intra-band carrier aggregation). A unified TCI framework for downlink/uplink beam indication may be used. Further, signaling mechanisms, such as more dynamic usage of control signaling, may be used to improve latency and efficiency.

For UEs equipped with multiple panels, various mechanisms may be used to facilitate uplink beam selection. For example, UL beam indication may be based on a unified TCI framework in which TCI states are associated with both UL and DL beam indication. Simultaneous transmission may be enabled across multiple panels, and fast panel selection may be enabled.

Enhancements to support multi-transmit/receive pair (TRP) deployment may target both the FR1 and FR2 bands. These enhancements may improve reliability and robustness for various channels, such as the physical downlink control channel (PDCCH), physical uplink shared channel (PUSCH), physical uplink control channel (PUCCH), etc. using multi-TRP and/or multi-panel transmission and reception. Various features may enable inter-cell multi-TRP operations, and some enhancements may allow for simultaneous multi-TRP transmission with multi-panel reception.

The TCI state framework used for downlink transmissions may be extended to uplink transmissions. Beam management generally includes TCI state-based quasi co-location (QCL) definitions for the downlink and spatial relation based configurations for the uplink. Default beams for use may be identified in the context of an uplink spatial relation for PUCCH and/or SRS and when a scheduling DCI is received within a scheduling threshold of a scheduled transmission on the physical downlink shared channel. Generally, the default parameters to use for SRS resources are defined; however, the default uplink parameters (e.g., default beam and/or default PL RS) may not be defined when an UL TCI state is not indicated or configured for uplink transmission.

When the uplink TCI state is not indicated or configured for uplink transmission of the physical uplink control channel, the physical uplink shared channel, sounding reference signals, and/or the physical random access channel (PRACH), embodiments of the present disclosure may allow for the default uplink beam and/or path loss (PL) reference signal (RS) to be determined according to a set of rules.

Figure 5:
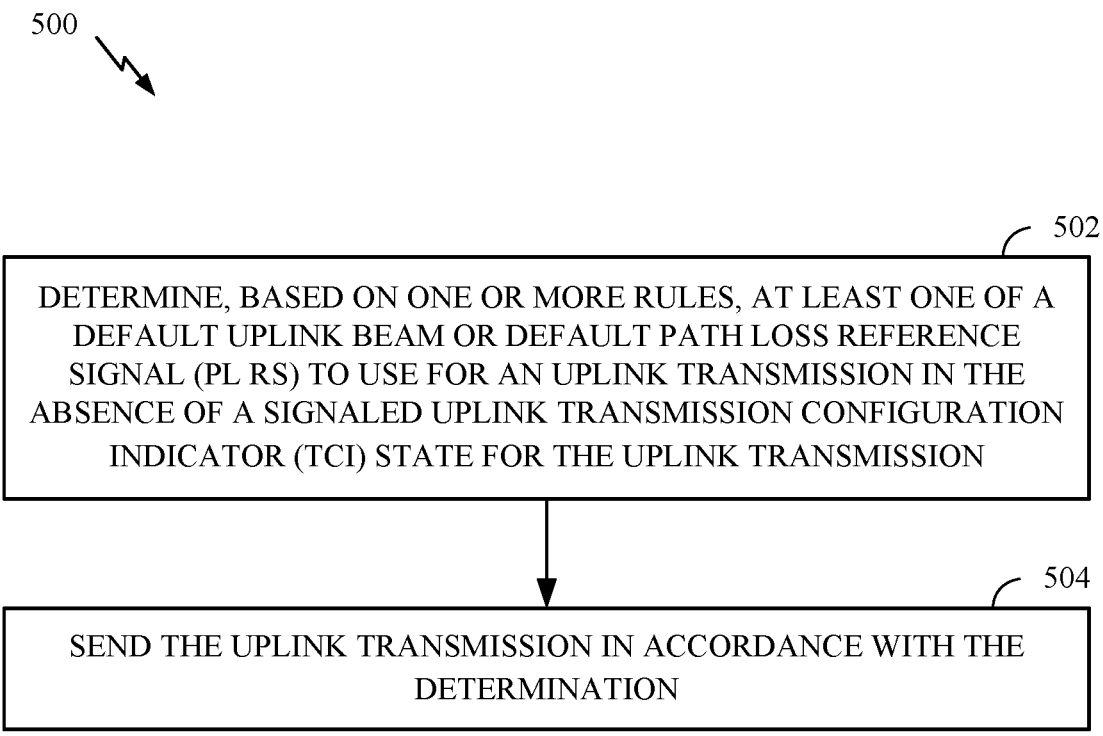
FIG. 5 illustrates example operations for wireless communication by a UE, in accordance with certain aspects of the present disclosure.

FIG. 5 illustrates example operations 500 that may be performed by a user equipment (UE) to determine an uplink beam for use in uplink transmissions.

As illustrated, operations 500 begin, at 502, where the UE determines, based on one or more rules, at least one of a default uplink beam or default path loss reference signal (PL RS) to use for an uplink transmission in the absence of a signaled uplink transmission configuration indicator (TCI) state for the uplink transmission. In some aspects, the one or more rules based on whether a control resource set (CORESET) is configured in an active DL BWP. If a CORESET is not configured in an active DL BWP, the rules may be based on whether certain TCI states are activated in an active DL BWP.

At 504, the UE sends the uplink transmission in accordance with the determination.

Figure 6:
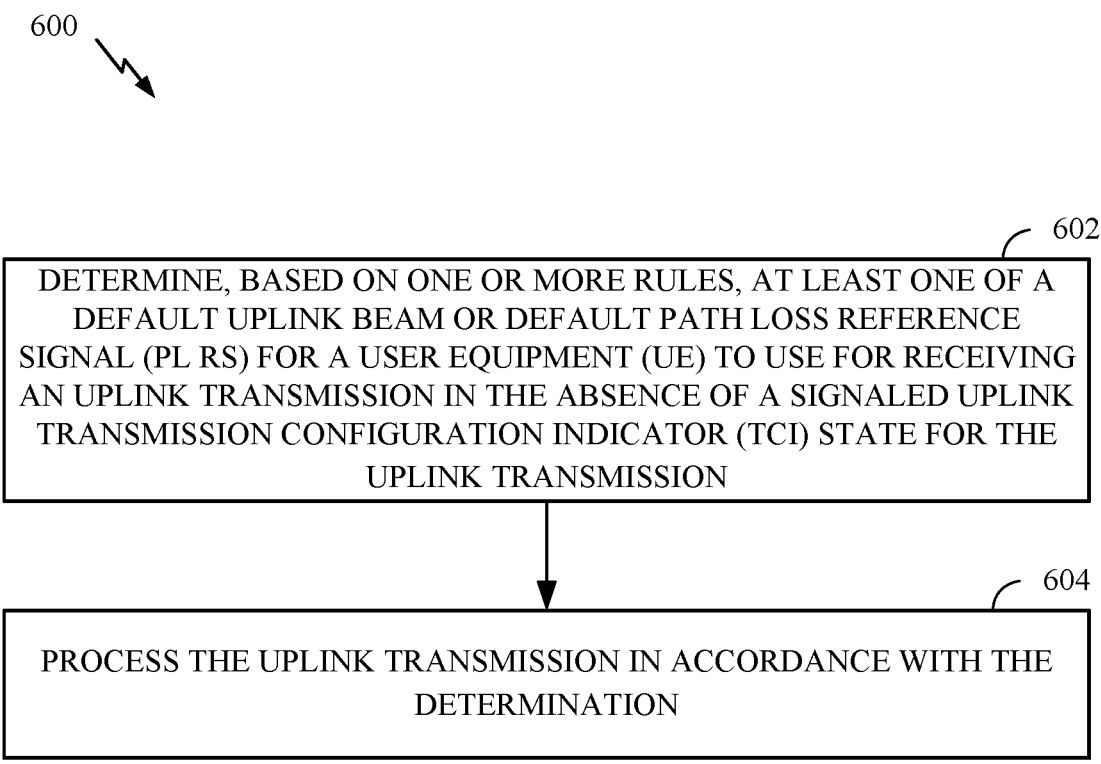
FIG. 6 illustrates example operations for wireless communication by a base station, in accordance with certain aspects of the present disclosure.

FIG. 6 illustrates example operations 600 that may be performed by a network entity to process received uplink transmissions based on the timing of an uplink transmission.

Operations 600 begin, at 602, where a network entity determines, based on one or more rules, at least one of a default uplink beam or default path loss reference signal (PL RS) for a user equipment (UE) to use an uplink transmission in the absence of a signaled uplink transmission configuration indicator (TCI) state for the uplink transmission.

At 604, the network entity processes the uplink transmission in accordance with the determination.

In some embodiments, when a CORESET is configured in an active downlink (DL) bandwidth part (BWP), the default beam and/or corresponding PL RS may follow a spatial QCL reference signal, such as the QCL-TypeD reference signal identified in the downlink TCI state or QCL assumptions of one CORESET in the active DL BWP. The QCL assumptions may be, for example, the QCL assumptions used for receiving the CORESET in the active DL BWP. For example, the QCL assumptions may be based on the CORESET with the lowest identifier or highest identifier in the active DL BWP. In some aspects, the default uplink beam may correspond to a downlink beam indicated by a DL TCI state.

In some embodiments, when a CORESET is not configured in an active DL BWP for uplink transmission, but at least one PDSCH TCI state is activated in the active DL BWP, the default UL beam and/or corresponding default PL RS may follow the QCL-TypeD reference signal in the active PDSCH TCI state or other downlink TCI state in the active DL BWP. The determined UL beam and/or PL RS may be corresponding, for example, to the beam and/or PL RS associated with a lowest or highest TCI state identifier in the active DL BWP. That is, the PDSCH TCI state may be used as a quasi-colocation (QCL) source in addition to or in lieu of using CSI-RSs or SSBs as a QCL source from which QCL assumptions may be made.

In some embodiments, if an uplink transmission is scheduled within a scheduling threshold using a DCI that carries the corresponding UL TCI state, the default TCI state may be used for uplink transmissions for an amount of time corresponding to a scheduling threshold period. The scheduling threshold period may be a configured value or a value determined based on a capability of the UE. After the scheduling threshold amount of time has elapsed, uplink transmissions may be performed according to the parameters (e.g., beam indication, PL RS, etc.) included in the UL TCI state. Before the scheduling threshold amount of time has expired, however, the default TCI state may be used for uplink transmissions. The default TCI state may be different from the UL TCI state carried in the received DCI.

Figure 7:
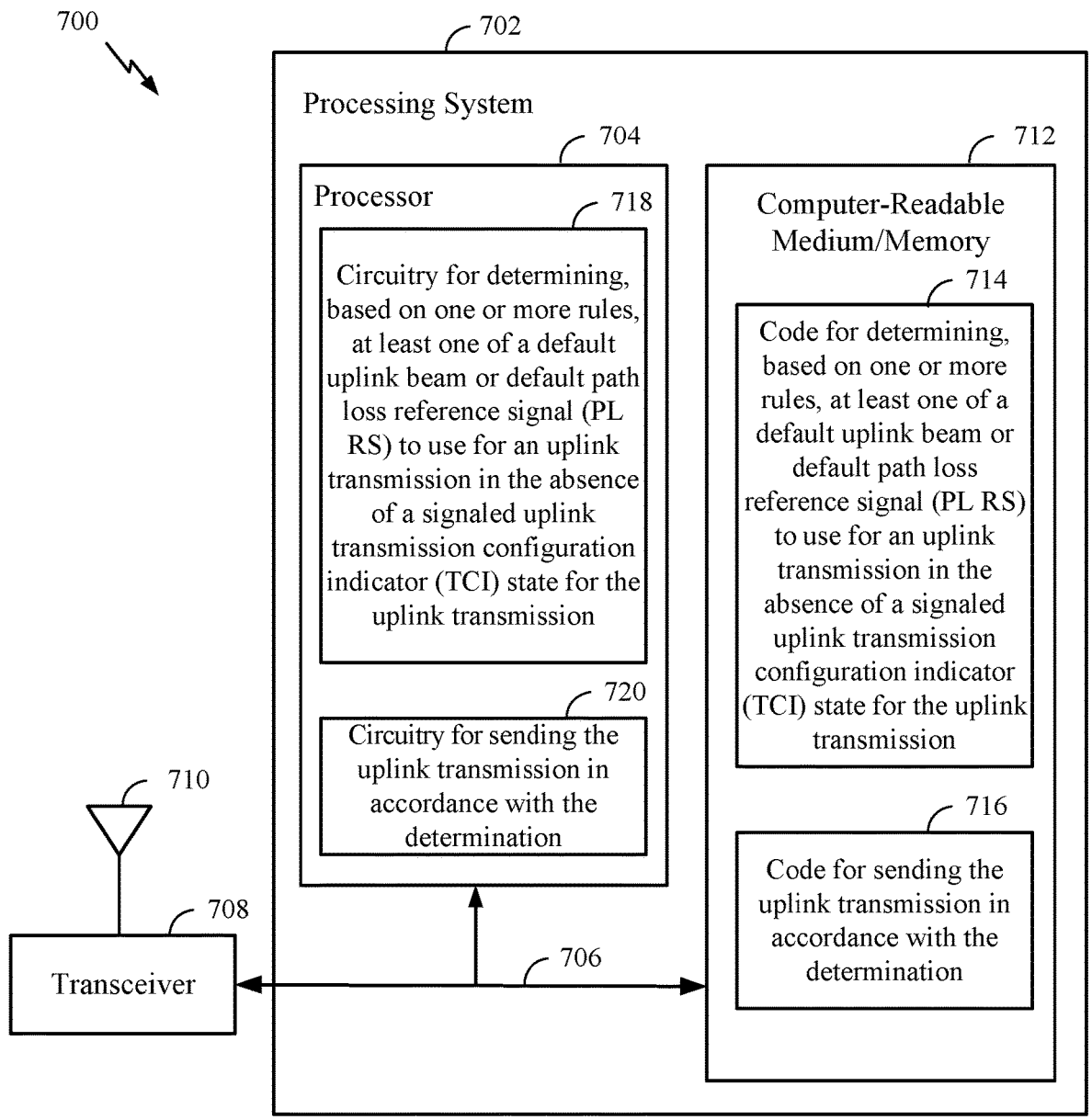
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for a beam switching gap. In certain aspects, computer-readable medium/memory 712 stores code 714 for determining, based on one or more rules, at least one of a default uplink beam or default path loss reference signal (PL RS) to use for an uplink transmission in the absence of a signaled uplink transmission configuration indicator (TCI) state for the uplink transmission; and code 716 for sending the uplink transmission in accordance with the determination, in accordance with aspects of the present disclosure. In certain aspects, the processor 704 has circuitry configured to implement the code stored in the computer-readable medium/memory 712. The processor 704 includes circuitry 718 for determining, based on one or more rules, at least one of a default uplink beam or default path loss reference signal (PL RS) to use for an uplink transmission in the absence of a signaled uplink transmission configuration indicator (TCI) state for the uplink transmission; and circuitry 720 for sending the uplink transmission in accordance with the determination, in accordance with aspects of the present disclosure.

Figure 8:
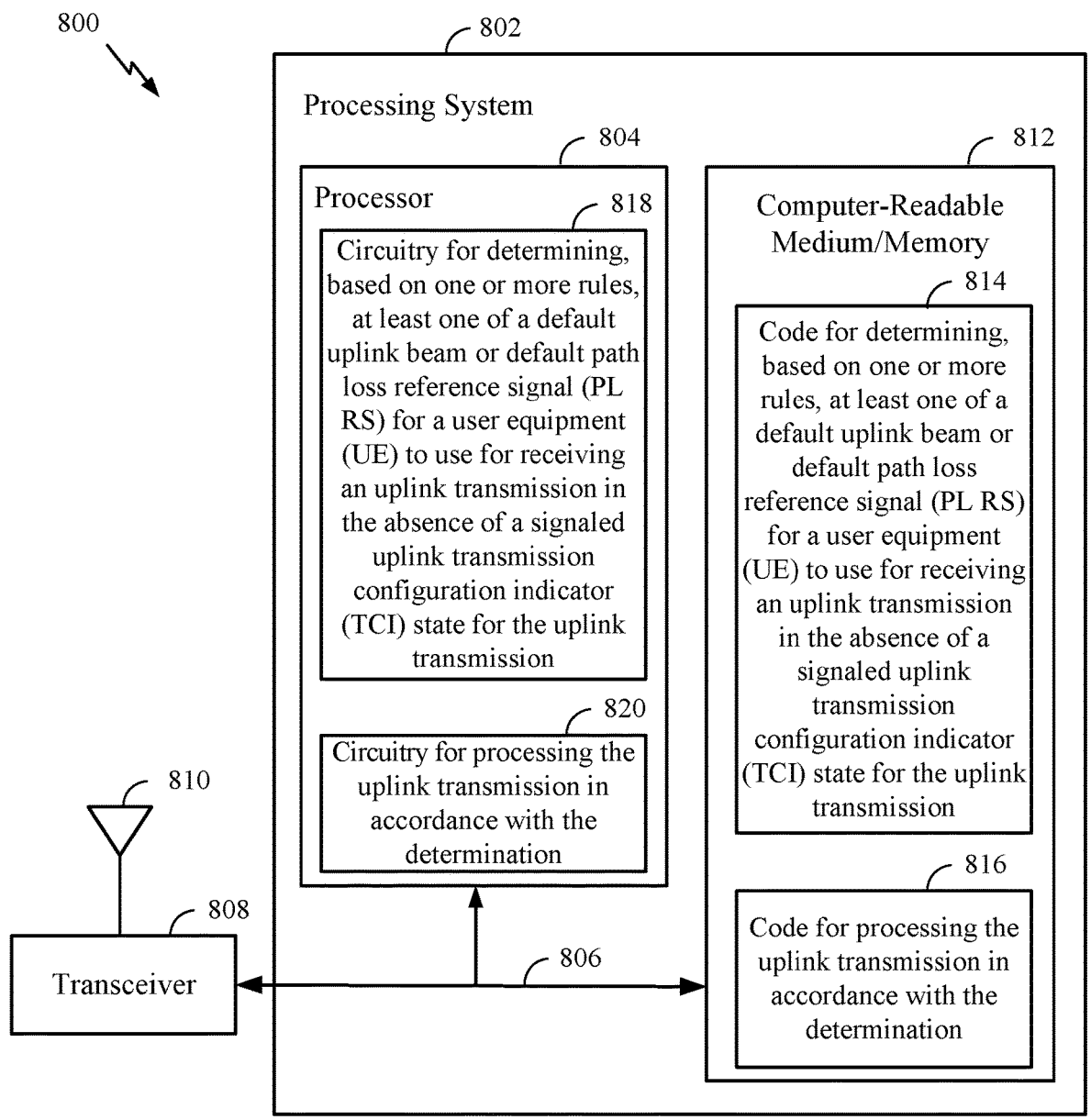
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for a beam switching gap. In certain aspects, computer-readable medium/memory 812 stores code 814 for determining, based on one or more rules, at least one of a default uplink beam or default path loss reference signal (PL RS) for a user equipment (UE) to use for receiving an uplink transmission in the absence of a signaled uplink transmission configuration indicator (TCI) state for the uplink transmission; and code 816 for processing the uplink transmission in accordance with the determination, in accordance with aspects of the present disclosure. In certain aspects, the processor 804 has circuitry configured to implement the code stored in the computer-readable medium/memory 812. The processor 804 includes circuitry 818 for determining, based on one or more rules, at least one of a default uplink beam or default path loss reference signal (PL RS) for a user equipment (UE) to use for receiving an uplink transmission in the absence of a signaled uplink transmission configuration indicator (TCI) state for the uplink transmission; and circuitry 820 for processing the uplink transmission in accordance with the determination, in accordance with aspects of the present disclosure.

Example Embodiments

Embodiment 1: A method of wireless communications by a User Equipment (UE), comprising: determining, based on one or more rules, at least one of a default uplink beam or default path loss reference signal (PL RS) to use for an uplink transmission in the absence of a signaled uplink transmission configuration indicator (TCI) state for the uplink transmission; and sending the uplink transmission in accordance with the determination.

Embodiment 2: The method of Embodiment 1, wherein the uplink transmission comprises at least one of a physical uplink control channel (PUCCH), a physical uplink shared channel (PUSCH), a sounding reference signal (SRS), or a physical random access channel (PRACH).

Embodiment 3: The method of Embodiments 1 or 2, wherein, according to one of the rules, the UE uses a downlink transmission configuration indicator (TCI) state as a quasi co-location source to determine at least one of the default uplink beam or PL RS.

Embodiment 4: The method of Embodiment 3, wherein the UE determines, as the default uplink beam, an uplink beam corresponding to a downlink beam indicated by the downlink TCI state.

Embodiment 5: The method of Embodiments 1 or 2, wherein, according to one of the rules: the UE determines at least one of the default uplink beam or default PL RS based on spatial quasi co-location (QCL) reference signal (RS) or QCL assumption of at least one control resource set (CORESET) in an active downlink bandwidth part (BWP).

Embodiment 6: The method of Embodiment 5, wherein, according to one of the rules: the spatial QCL RS comprises a QCL Type-D RS.

Embodiment 7: The method of Embodiments 5 or 6, wherein the at least one CORESET is selected based on a value of its CORESET ID relative to one or more other CORESET IDs in the active downlink BWP.

Embodiment 8: The method of Embodiments 1 or 2, wherein, according to one of the rules: the UE determines, when a control resource set (CORESET) is not configured in an active downlink bandwidth part (BWP), at least one of the default uplink beam or default PL RS based on a spatial quasi co-location (QCL) reference signal (RS) in an active physical downlink shared channel (PDSCH) transmission configuration indicator (TCI) state in an active downlink bandwidth part (BWP).

Embodiment 9: The method of Embodiment 8, wherein the at active PDSCH TCI state is selected based on a value of its TCI state ID relative to one or more other TCI state IDs in the active downlink BWP.

Embodiment 10: The method of Embodiments 1 through 9, wherein the UE is configured to use the default uplink beam or default PL RS if the uplink transmission is scheduled within a threshold scheduling period by a downlink control information (DCI) that carries a corresponding uplink transmission configuration indicator (TCI) state for the uplink transmission.

Embodiment 11: The method of Embodiment 10, wherein the threshold scheduling period is at least one of a configured value or determined based on capability of the UE.

Embodiment 12: A method of wireless communications by a network entity, comprising: determining, based on one or more rules, at least one of a default uplink beam or default path loss reference signal (PL RS) for a user equipment (UE) to use for receiving an uplink transmission in the absence of a signaled uplink transmission configuration indicator (TCI) state for the uplink transmission; and processing the uplink transmission in accordance with the determination.

Embodiment 13: The method of Embodiment 12, wherein the uplink transmission comprises at least one of a physical uplink control channel (PUCCH), a physical uplink shared channel (PUSCH), a sounding reference signal (SRS), or a physical random access channel (PRACH).

Embodiment 14: The method of Embodiments 12 or 13, wherein, according to one of the rules, the network entity determines the UE uses a downlink transmission configuration indicator (TCI) state as a quasi co-location source to determine at least one of the default uplink beam or PL RS.

Embodiment 15: The method of Embodiment 14, wherein the network entity determines that the UE uses, as the default uplink beam, an uplink beam corresponding to a downlink beam indicated by the downlink TCI state.

Embodiment 16: The method of Embodiments 12 or 13, wherein, according to one of the rules: the network entity determines the UE uses at least one of the default uplink beam or default PL RS based on spatial quasi co-location (QCL) reference signal (RS) or QCL assumption of at least one control resource set (CORESET) in an active downlink bandwidth part (BWP).

Embodiment 17: The method of Embodiment 16, wherein, according to one of the rules: the spatial QCL RS comprises a QCL Type-D RS.

Embodiment 18: The method of Embodiments 16 or 17, wherein the at least one CORESET is selected based on a value of its CORESET ID relative to one or more other CORESET IDs in the active downlink BWP.

Embodiment 19: The method of Embodiments 12 or 13, wherein, according to one of the rules: the network entity determines, when a control resource set (CORESET) is not configured in an active downlink bandwidth part (BWP), the UE uses at least one of the default uplink beam or default PL RS based on a spatial quasi co-location (QCL) reference signal (RS) in an active physical downlink shared channel (PDSCH) transmission configuration indicator (TCI) state in an active downlink bandwidth part (BWP).

Embodiment 20: The method of Embodiment 19, wherein the at active PDSCH TCI state is selected based on a value of its TCI state ID relative to one or more other TCI state IDs in the active downlink BWP.

Embodiment 21: The method of Embodiments 12 through 20, wherein the network entity determines the UE is configured to use the default uplink beam or default PL RS if the uplink transmission is scheduled within a threshold scheduling period by a downlink control information (DCI) that carries a corresponding uplink transmission configuration indicator (TCI) state for the uplink transmission.

Embodiment 22: The method of Embodiment 21, wherein the threshold scheduling period is at least one of a configured value or determined based on capability of the UE.

Embodiment 23: An apparatus for wireless communications by a user equipment (UE), comprising: a processor; and a memory having instructions which, when executed by the processor, performs the operations of any of Embodiments 1 through 11.

Embodiment 24: An apparatus for wireless communications by a network entity, comprising: a processor; and a memory having instructions which, when executed by the processor, performs the operations of any of Embodiments 12 through 22.

Embodiment 25: An apparatus for wireless communications by a user equipment (UE), comprising: means capable of performing the operations of any of Embodiments 1 through 11.

Embodiment 26: An apparatus for wireless communications by a network entity, comprising: means capable of performing the operations of any of Embodiments 12 through 22

Embodiment 27: A computer-readable medium having instructions stored thereon which, when executed by a processor, performs the operations of any of Embodiments 1 through 11.

Embodiment 28: A computer-readable medium having instructions stored thereon which, when executed by a processor, performs the operations of any of Embodiments 12 through 22.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one"

unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, the various processor shown in FIG. 3 may be configured to perform operations 1000 and 1100 of FIGS. 10 and 11.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIGS. 15 and 16).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a User Equipment (UE), comprising:
   determining, based on one or more rules, at least one of a default uplink beam or default path loss reference signal (PL RS) to use for an uplink transmission in the absence of a signaled uplink transmission configuration indicator (TCI) state for the uplink transmission; and
   sending the uplink transmission in accordance with the determination.

2. The method of claim 1, wherein the uplink transmission comprises at least one of a physical uplink control channel (PUCCH), a physical uplink shared channel (PUSCH), a sounding reference signal (SRS), or a physical random access channel (PRACH).

3. The method of claim 1, wherein, according to one of the rules, the UE uses a downlink transmission configuration indicator (TCI) state as a quasi co-location source to determine at least one of the default uplink beam or PL RS.

4. The method of claim 3, wherein the UE determines, as the default uplink beam, an uplink beam corresponding to a downlink beam indicated by the downlink TCI state.

5. The method of claim 1, wherein, according to one of the rules:
   the UE determines at least one of the default uplink beam or default PL RS based on spatial quasi co-location (QCL) reference signal (RS) or QCL assumption of at least one control resource set (CORESET) in an active downlink bandwidth part (BWP).

6. The method of claim 5, wherein, according to one of the rules:
   the spatial QCL RS comprises a QCL Type-D RS.

7. The method of claim 5, wherein the at least one CORESET is selected based on a value of its CORESET ID relative to one or more other CORESET IDs in the active downlink BWP.

8. The method of claim 1, wherein, according to one of the rules:
   the UE determines, when a control resource set (CORESET) is not configured in an active downlink bandwidth part (BWP), at least one of the default uplink beam or default PL RS based on a spatial quasi co-location (QCL) reference signal (RS) in an active physical downlink shared channel (PDSCH) transmission configuration indicator (TCI) state in an active downlink bandwidth part (BWP).

9. The method of claim 8, wherein the active PDSCH TCI state is selected based on a value of its TCI state ID relative to one or more other TCI state IDs in the active downlink BWP.

10. The method of claim 1, wherein the UE is configured to use the default uplink beam or default PL RS if the uplink transmission is scheduled within a threshold scheduling period by a downlink control information (DCI) that carries a corresponding uplink transmission configuration indicator (TCI) state for the uplink transmission.

11. The method of claim 10, wherein the threshold scheduling period is at least one of a configured value or determined based on capability of the UE.

12. A method of wireless communications by a network entity, comprising:
   determining, based on one or more rules, at least one of a default uplink beam or default path loss reference signal (PL RS) for a user equipment (UE) to use for receiving an uplink transmission in the absence of a signaled uplink transmission configuration indicator (TCI) state for the uplink transmission; and
   processing the uplink transmission in accordance with the determination.

13. The method of claim 12, wherein the uplink transmission comprises at least one of a physical uplink control channel (PUCCH), a physical uplink shared channel (PUSCH), a sounding reference signal (SRS), or a physical random access channel (PRACH).

14. The method of claim 12, wherein, according to one of the rules, the network entity determines the UE uses a downlink transmission configuration indicator (TCI) state as a quasi co-location source to determine at least one of the default uplink beam or PL RS.

15. The method of claim 14, wherein the network entity determines that the UE uses, as the default uplink beam, an uplink beam corresponding to a downlink beam indicated by the downlink TCI state.

16. The method of claim 12, wherein, according to one of the rules:
   the network entity determines the UE uses at least one of the default uplink beam or default PL RS based on spatial quasi co-location (QCL) reference signal (RS) or QCL assumption of at least one control resource set (CORESET) in an active downlink bandwidth part (BWP).

17. The method of claim 16, wherein, according to one of the rules:
   the spatial QCL RS comprises a QCL Type-D RS.

18. The method of claim 16, wherein the at least one CORESET is selected based on a value of its CORESET ID relative to one or more other CORESET IDs in the active downlink BWP.

19. The method of claim 12, wherein, according to one of the rules:
the network entity determines, when a control resource set (CORESET) is not configured in an active downlink bandwidth part (BWP), the UE uses at least one of the default uplink beam or default PL RS based on a spatial quasi co-location (QCL) reference signal (RS) in an active physical downlink shared channel (PDSCH) transmission configuration indicator (TCI) state in an active downlink bandwidth part (BWP).

20. The method of claim 19, wherein the active PDSCH TCI state is selected based on a value of its TCI state ID relative to one or more other TCI state IDs in the active downlink BWP.

21. The method of claim 12, wherein the network entity determines the UE is configured to use the default uplink beam or default PL RS if the uplink transmission is scheduled within a threshold scheduling period by a downlink control information (DCI) that carries a corresponding uplink transmission configuration indicator (TCI) state for the uplink transmission.

22. The method of claim 21, wherein the threshold scheduling period is at least one of a configured value or determined based on capability of the UE.

23. An apparatus for wireless communications by a user equipment (UE), comprising:
a processor configured to:
determine, based on one or more rules, at least one of a default uplink beam or default path loss reference signal (PL RS) to use for an uplink transmission in the absence of a signaled uplink transmission configuration indicator (TCI) state for the uplink transmission; and
send the uplink transmission in accordance with the determination; and
a memory.

24. The apparatus of claim 23, wherein, according to one of the rules:
the UE determines at least one of the default uplink beam or default PL RS based on spatial quasi co-location (QCL) reference signal (RS) or QCL assumption of at least one control resource set (CORESET) in an active downlink bandwidth part (BWP).

25. The apparatus of claim 24, wherein, according to one of the rules:
the spatial QCL RS comprises a QCL Type-D RS.

26. The apparatus of claim 24, wherein the at least one CORESET is selected based on a value of its CORESET ID relative to one or more other CORESET IDs in the active downlink BWP.

27. The apparatus of claim 23, wherein, according to one of the rules:
the UE determines, when a control resource set (CORESET) is not configured in an active downlink bandwidth part (BWP), at least one of the default uplink beam or default PL RS based on a spatial quasi colocation (QCL) reference signal (RS) in an active physical downlink shared channel (PDSCH) transmission configuration indicator (TCI) state in an active downlink bandwidth part (BWP).

28. The apparatus of claim 27, wherein the active PDSCH TCI state is selected based on a value of its TCI state ID relative to one or more other TCI state IDs in the active downlink BWP.

29. The apparatus of claim 23, wherein the UE is configured to use the default uplink beam or default PL RS if the uplink transmission is scheduled within a threshold scheduling period by a downlink control information (DCI) that carries a corresponding uplink transmission configuration indicator (TCI) state for the uplink transmission.

30. An apparatus for wireless communications by a user equipment (UE), comprising:
means for determining, based on one or more rules, at least one of a default uplink beam or default path loss reference signal (PL RS) to use for an uplink transmission in the absence of a signaled uplink transmission configuration indicator (TCI) state for the uplink transmission; and
means for sending the uplink transmission in accordance with the determination.

* * * * *